United States Patent [19]

Joseph

[11] 4,160,596
[45] Jul. 10, 1979

[54] DOCUMENT REPRODUCTION ILLUMINATION/EXPOSURE CONTROL SYSTEM

[75] Inventor: Robert E. Joseph, Dumfries, Va.

[73] Assignee: The United States of America as represented by the Secretary of Commerce, Washington, D.C.

[21] Appl. No.: 843,293

[22] Filed: Oct. 18, 1977

[51] Int. Cl.² ............................................. G03B 27/78
[52] U.S. Cl. ......................................... 355/68; 355/83
[58] Field of Search ...................... 355/68, 69, 71, 83, 355/38; 356/202, 203, 443, 444

[56] References Cited

U.S. PATENT DOCUMENTS

| | | | |
|---|---|---|---|
| 3,413,065 | 11/1968 | Funk | 356/202 |
| 3,519,347 | 7/1970 | Bowker et al. | 355/88 |
| 3,640,623 | 2/1972 | Florsheim, Jr. et al. | 355/67 |
| 3,663,110 | 5/1972 | Rising | 355/38 |
| 3,709,613 | 1/1973 | Zahn et al. | 356/202 |
| 3,738,242 | 6/1973 | Lee et al. | 354/4 |
| 3,756,713 | 9/1973 | Isermann | 355/83 |
| 3,760,699 | 9/1973 | Tsujimoto | 354/34 |
| 3,818,496 | 6/1974 | Lee et al. | 354/75 |
| 3,855,601 | 12/1974 | Uchiyama et al. | 354/31 |
| 3,867,029 | 2/1975 | Weinert | 355/88 |
| 3,872,483 | 3/1975 | Numata et al. | 354/53 |
| 3,888,580 | 6/1975 | Amano et al. | 355/38 |
| 3,891,317 | 6/1975 | Walker | 355/68 |
| 3,947,112 | 3/1976 | Hahn et al. | 355/68 |
| 3,947,117 | 3/1976 | Basu et al. | 355/68 |
| 4,001,594 | 1/1977 | Akimoto et al. | 356/202 |
| 4,009,959 | 3/1977 | Watson et al. | 355/71 |
| 4,015,274 | 3/1977 | Takahashi et al. | 354/23 D |
| 4,016,574 | 4/1977 | Iwata et al. | 354/29 |
| 4,025,190 | 5/1977 | Hughes | 355/68 |

Primary Examiner—L. T. Hix
Assistant Examiner—W. J. Brady
Attorney, Agent, or Firm—Eugene J. Pawlikowski; Alvin J. Englert

[57] ABSTRACT

A document reproduction illumination/exposure control system, for ascertaining the photometric qualities of a document to be photographically reproduced and providing a responsive control signal for illumination and exposure parameters for a document reproduction apparatus, is comprised of a source of radiation for illuminating a document to be reproduced, a detector for receiving radiation incident from the document and generating a radiation-detected signal proportional thereto, storage devices for storing spectral response information regarding the image-recording medium upon which an image of the document is to be reproduced, and an illumination/exposure correction device for receiving a correctional signal representative of the correlation between the radiation-detected signal and the stored spectral response information, whereby illumination and/or exposure parameters for the reproduction apparatus may be appropriately balanced to account for variations in the spectral qualities of the document.

9 Claims, 3 Drawing Figures

DOCUMENT REPRODUCTION ILLUMINATION/EXPOSURE CONTROL SYSTEM

BACKGROUND OF THE INVENTION

1. Field of the Invention

The present invention relates, broadly, to a document reproduction illumination/exposure system and, more specifically to a system for controlling the illumination and exposure parameters of a photographic or microphotographic document reproduction apparatus.

2. Description of the Prior Art

The art recognizes the need to provide both illumination and exposure control, preferably in concert, during various photographic operations. The need to so control exposure times, intensity of exposure radiation and quality thereof, and the like, are quite obvious when it is desired to maximize the quality of photographic reproductions.

Accordingly, the photographic arts have developed various light and exposure metering systems to ascertain the spectral qualities of an object or subject to be reproduced, and which correlate those spectral qualities with like qualities of the image-recording medium. Diverse approaches to accomplish these ends are described in, for example, U.S. Pat. No. 3,760,699, No. 3,855,601, No. 3,872,483, No. 3,992,098, No. 4,015,274 and No. 4,016,574, particularly respecting the control of shutters or other exposure devices in cameras. Conceptually similar devices, albeit, more exotic, are described in U.S. Pat. No. 3,519,347, No. 3,891,317 and No. 4,009,959, exemplary of photographic printers and the like.

In the case of the aforementioned United States. patents which disclose devices for controlling camera shutters or analogous exposure means, the same principally rests upon an operator manipulation of exposure control based upon a numeric or meter display of the spectral qualities of the subject to be reproduced. These displays may involve the matching of movable and stationary needles; a "go-no go" system; a digital display of appropriate exposure characteristics; etc. Moreover, the sensing devices for ascertaining the appropriate spectral characteristics of the subject typically measure gross parameters via one, or possibly two, photodetectors. Consequently, these systems are not adaptable for the broad range of document reproduction requirements.

The same may basically be said of the aforementioned references to photographic printing devices. While well adapted and designed for their intended purposes, the illumination/exposure control systems employed are extremely complicated and intended to control the quality of projecting light from the printer onto the photographic film based upon, primarily, the spectral qualities of the image film and image-receiving film. Consequently, these systems also fail to provide adequate illumination/exposure control when one attempts to adapt the same for the recording of documentary information from an original document of variable spectral qualities onto, for example, a microfiche, microfilm or the like.

Certain devices expressly directed to applications for document reproduction such as, for example, by filming, have indeed attempted to extrapolate from conventional photographic approaches such as those mentioned above. Exemplary of these devices are U.S. Pat. No. 3,947,112 and No. 4,025,190, which rely, essentially, on first establishing a reference datum level corresponding to the optimum exposure and/or illumination settings, and thence adjusting the exposure/illumination parameters in response to a detected indication of, typically, illumination intensity. Conceptually similar is the device disclosed in U.S. Pat. No. 3,640,623, wherein an operator visually compares document or subject density with a density scale, after which evaluation he may automatically establish illumination/exposure parameters. These approaches have obvious drawbacks in requiring substantial operator intervention, and lack of flexibility between various image-recording media without recalibration.

Still further approaches for controlling illumination in a reproduction system are disclosed in U.S. Pat. No. 3,738,242, No. 3,818,496 and No. 3,947,117. The common thread among these references is the maintenance of a prescribed illumination level, wherein illumination is monitored and appropriately adjusted to insure a uniformity thereof. In the first and second mentioned references, the system involved is, for example, a photo-optical drafting machine, or similar apparatus wherein a radiation beam must be precisely controlled in response to relative translation thereof in order to yield a high quality reproduction. In the last mentioned reference, the illuminating radiation is employed for the photocopying of documents or the like, and the system maintains optimum light intensity at the image-forming surface to account for aging of the radiation source. All of the aforementioned approaches are considered either unadaptable, or too esoteric, to be readily adaptable for the control of illumination/exposure parameters in the photographic reproduction of documents; particularly microphotographic reproduction thereof.

Accordingly, the need exists to simply, economically, and yet efficiently provide for the control of illumination and/or exposure parameters in the photographic reproduction of a wide range of original documents having widely differing spectral qualities, and which also provides the ability to employ a wide range of image-recording media likewise having widely differing spectral response characteristics.

SUMMARY OF THE INVENTION

In accordance with the aforenoted references in the prior art, it is a primary object of the present invention to provide a simple, economical, yet highly efficient illumination/exposure control system for correlating the spectral characteristics of a document to be reproduced with the spectral response qualities of an image-recording medium therefor.

It is another object of the present invention to provide an illumination/exposure control system for the reproduction of documents on an image-recording medium, wherein the system may be employed with documents having widely differing spectral properties, and also with image-recording media having widely different spectral response characteristics.

Yet a further object of the present invention is to provide a semi-automatic illumination/exposure control system for use in conjunction with a document recording apparatus whereby the spectral qualities of a document to be reproduced are correlated specifically with the spectral characteristics of an image-recording medium employed for reproduction thereof.

Still a further object of the present invention is to provide a fully automatic illumination/exposure control system for use in conjunction with a document reproduction apparatus wherein the spectral qualities of a document to be reproduced are specifically correlated with the spectral response characteristics of the image-recording medium employed therefor.

It has now been determined, in accordance with the present invention, that the foregoing objects may be realized in a document reproduction illumination/exposure control system by providing a variable illumination means for projecting radiation on a document to be reproduced, in concert with a detector and comparator subsystem for receiving detected illumination incident from the document and comparing the same with stored spectral response information for the specific image-recording medium employed, the subsystem providing correction signals to correlate the parameters between the spectral characteristics of the document and spectral response characteristics of the medium for recording the same. Parameters particularly indicative of document quality are line density and background intensities. The correction signals may be simply displayed for an operator, who may then appropriately adjust either or both the illumination incident upon the document and the gate system on the apparatus for reproducing the same, or the appropriate adjustments may be made automatically, as, for example, hydraulically or electrically.

BRIEF DESCRIPTION OF THE DRAWINGS

Yet further objects and advantages of the present invention will become apparent to the skilled artisan upon examination of the detailed description which follows, taken in conjunction with the appended figures wherein.

DETAILED DESCRIPTION OF THE INVENTION

The illumination/exposure control system of the present invention is specifically designed for use in correlating the spectral qualities of a document to be reproduced and the spectral response characteristics of the image-forming medium therefor. This is accomplished, in fundamental terms, by analyzing the spectral qualities of the document to be reproduced, comparing the same with the spectral characteristics of the recording medium, and appropriately adjusting illumination and/or exposure in order to maximize the quality of the reproduction. The term "document", as used herein, is meant to connote any tangible item including, particularly, paper documents, photographs, and the like; albeit, the present control system is widely adaptable for the reproduction of numerous other objects. Likewise, as used herein, the terms "image-recording" or "image-receiving" are meant to connote, particularly, photographic films, including microfiche and microfilm; albeit any photographic or electrophotographic process wherein illumination and exposure control are critical may well make use of the control system of the present invention.

In the reproduction of various documents, it would obviously be optimal if the documents were cleanly printed on uniformly reflective substrates. However, it is found that the reproduction of documents entails copying many diverse items, such as, for example, old, wrinkled or cracked papers, documents with thin base substrates or colored paper backgrounds, photographs, highly reflective paperstocks, etc. Thus, a wide spectrum of documents exhibiting significantly differing reflectance properties must be considered in fashioning a system to optimize the quality of the reproduction. Likewise, for differing applications, different image-receiving media are employed. Consequently, the system must be able to account for variations in the spectral response characteristics of, a number of, e.g., photosensitive substrates and documents.

Figure 1:
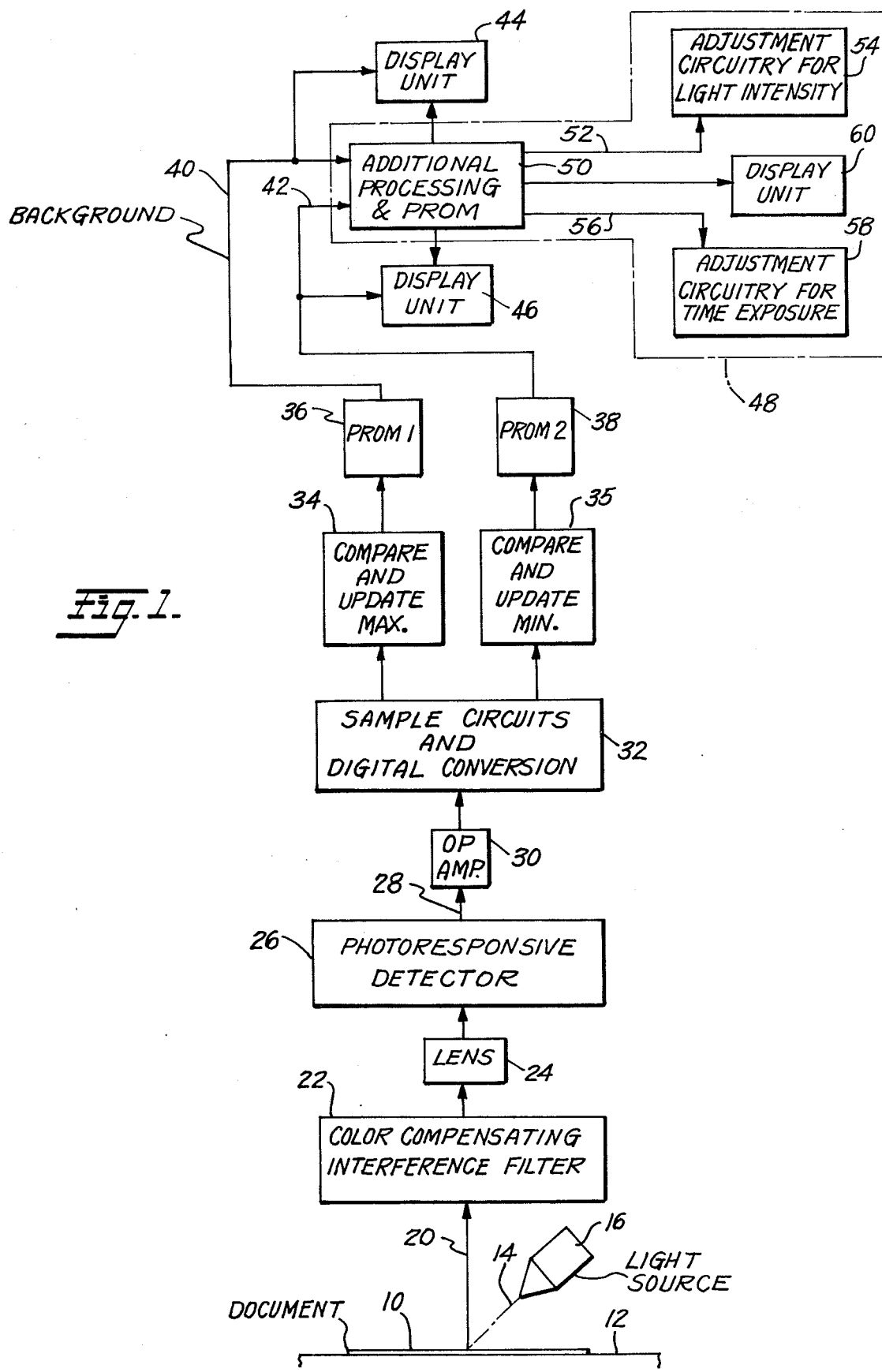
FIG. 1 is an overall schematic diagram of the illumination/exposure control system of the present invention.

The illumination/exposure control system schematically illustrated in FIG. 1 properly balances these diverse, and often competing, factors. With particular reference to FIG. 1, a document to be reproduced 10 is positioned on a supporting member 12, and is subjected to a beam of projecting radiation 14 from a variable light source 16. The light source 16 may provide light within the visible spectrum, or depending upon the application, any other suitable portion of the electromagnetic spectrum provided the image-recording medium is photosensitive thereto. This follows as a consequence of the fact that the light beam 14 is that which illuminates the document 10 for reproduction. An incident beam 20 of reflected radiation from document 10 is passed through a color compensating interference filter 22 and lens member 24 to a photoresponsive detector member 26. While the embodiment shown in FIG. 1 employs a reflected beam 20, due to the positioning of light source 16, it is obvious that the light source could be located beneath the document 10 and the beam 20 thus be a transmitted radiation beam. This, obviously, depends upon the nature of the document to be reproduced and the specific requirements of a given application.

The optical components 22 and 24, i.e., the filter and lens, respectively, serve to both centralize the reflected document image on the photoresponsive detector member 26 and also to compensate for the spectral response characteristics of both the image-recording medium employed and the photosensitive detector member 26 itself. Similarly, the magnification factor of the lens and frequency spectrum characteristics of the filter are selected to account for the desired sampling area for detection by photosensitive detector member 26, the general document characteristics (e.g., whether it be a highly reflective photograph versus white paper), and the response of both the image-receiving medium and the photosensitive detector member 26.

The photosensitive detector member 26, which may, for example, be a linear photodiode array, samples the magnified and compensated light beam 20 and provides an electrical signal 28 representative thereof. This signal, which is shown in FIG. 1 as an analog signal, is amplified by an op amp 30 in storage and digitized in an A/D converter 32. Obviously, this additional circuitry could be eliminated depending upon the nature of the output signal 28 from detector 26, which could well be a digitized signal. Regardless, however, of the absolute electrical nature of the radiation-detected signal 28, two comparing devices 34 and 35 each receive a signal proportional to the detected incident radiation 20. Device 34 is used to obtain a maximum value of light received from detector 26 corresponding to a background value for the document (for the reflected light geometry of FIG. 1). Device 35 is used to obtain a minimum value of reflected light as measured by detector 26 and corresponds to a line density value of the document 10.

Two storage devices 36 and 38, for example, PROMs, are provided for storing representative information regarding the spectral response characteristics of the image-receiving medium. Salient information might include, for photographic film media, speed, latitude, sensitivity to various portions of the electromagnetic spectrum, and the like. The various characteristics stored in storage devices 36 and 38 may have been determined analytically or empirically for the given image-recording medium employed. PROM 36 is used to correlate the background value of document 10 to the film characteristics, whereas PROM 38 is used to correlate the line density value of the document 10 to the film characteristics. Typically, the PROMs 36 and 38 will have different tabular information, but for some films the information may be overlapping or equivalent.

The output of PROMs 36 and 38 is fed via lines 40 and 42 respectively to display units 44 and 46. Alternately, a single display unit may be provided together with switching means to alternately display the values selected. The visual display permits an independent operator to intervene in the system for adjustment of the illumination and exposure parameters.

If desired, automatic circuitry 48 may be provided which responds to the outputs of PROMs 36 and 38 and automatically adjust the illumination and control system to provide the proper light intensity and/or exposure time. The automatic circuitry 48 may be comprised of additional circuitry and PROM 50 which receives the outputs from PROMs 36 and 38 and provides a signal on lines 52 corresponding to the desired light intensity to initiate the adjustment circuitry 54 to automatically correct the light intensity of the light beam 14 striking the document 10. The additional circuitry and PROM 50 also permit a signal on line 56 to initiate adjustment circuitry 59 to obtain the correct exposure time. Also, a display unit 60 may be connected to the additional circuitry and PROM 50 to enable visual display of the control values on lines 52 and 56. Further, the additional circuitry and PROM 50 is connected to display units 44 and 46 in order that the background and line density values may be readily displayed.

The values of line density and background have been found to be particularly indicative of document quality, and a reliable contrast value may be obtained from the difference between these two values.

Figure 2:
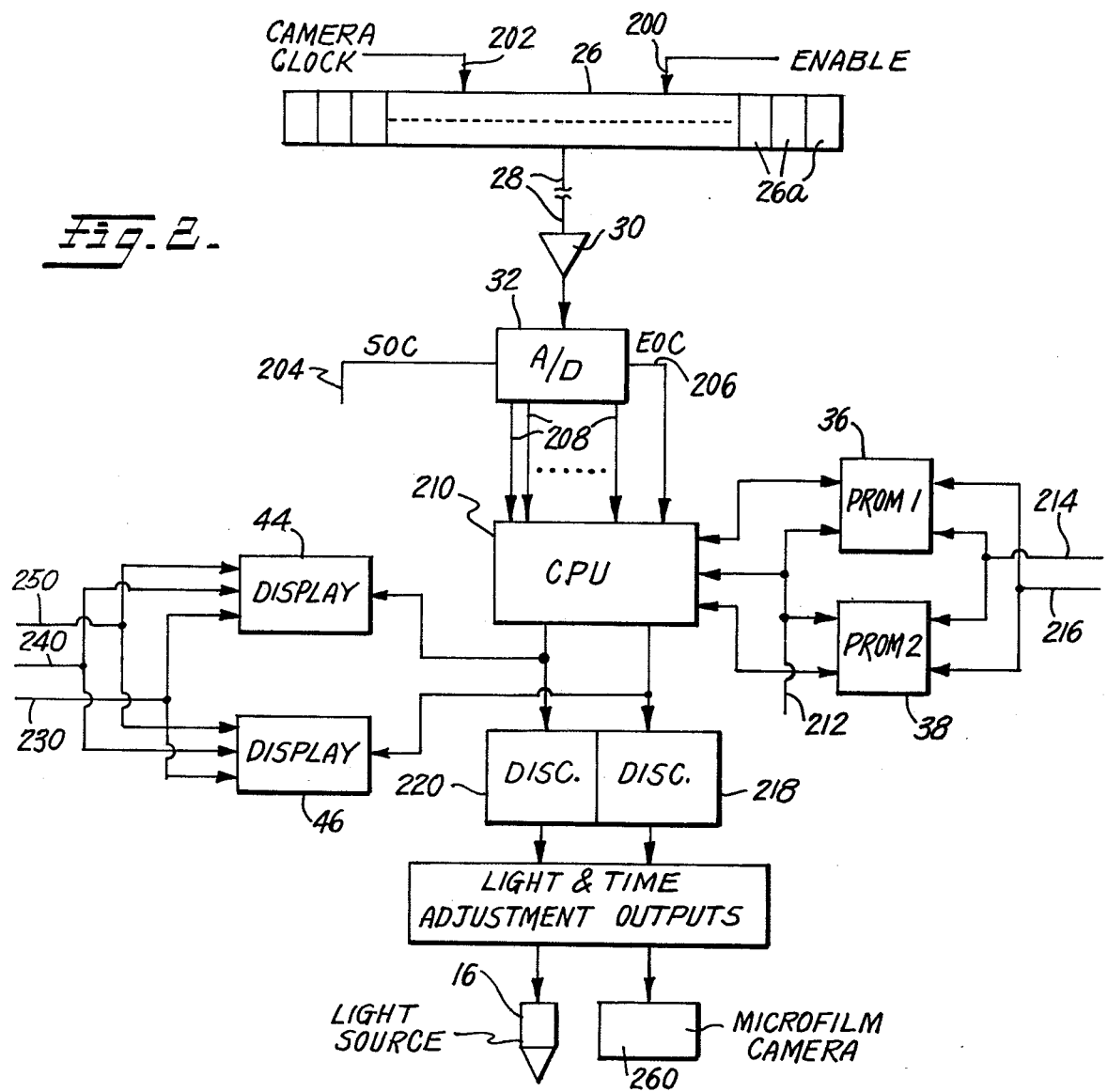
FIG. 2 is a schematic diagram of the digitizing and correction subsystem of the present invention.
Figure 3:
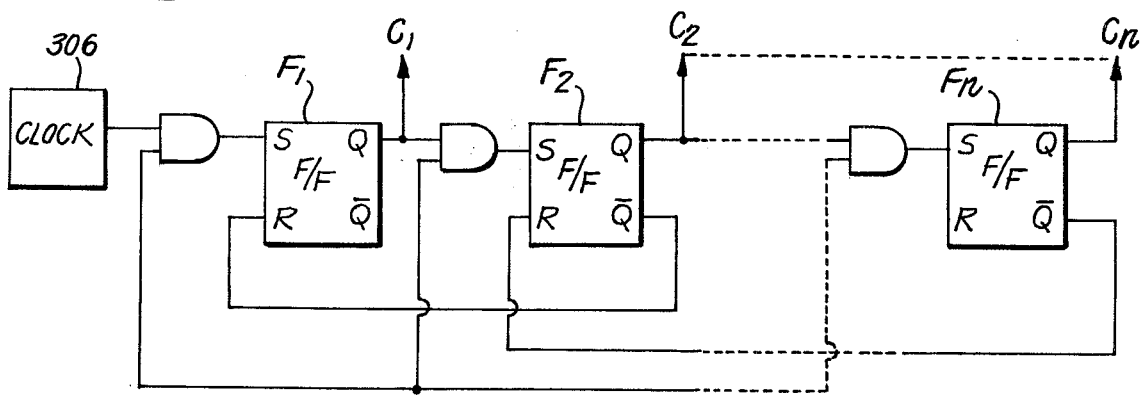
FIG. 3 is a simplified schematic diagram of a clock circuit for use with the present invention.

FIGS. 2 and 3 illustrate the preferred embodiments of various subsections schematically illustrated in FIG. 1. As such, the skilled artisan will appreciate that the same are illustrative, and in no wise limitative.

FIG. 2 schematically illustrates the sampling and conversion subsystem of the present invention. The photosensitive detector member 26 is preferably comprised of a linear array of photodiodes for detecting the spectral qualities of the document 10 to be reproduced. Most preferably, the array is comprised of 256 individual photodiodes or cells 26a which are capable of sampling a line area across the whole or a portion of document 10. However, while it has been determined that such linear sampling of, for example, a one to three inch line is sufficient to provide necessary correction information regarding light intensity and exposure levels, obviously any geometric arrangement of the individual photodiodes is equally well conceivable depending upon the desires of the user. The detector member 26 is preferably sampled at a 100 KHz rate with a 4 msec. cycle time, which sampling is controlled by an enable pulse 200 and a camera clock 202 applied to the array control. Typically each cell 26a provides an analog output pulse which is digitized and processed in accordance with the apparatus set forth herein.

One such photoresponsive detector member 26 which must be used with the instant invention is Model RL-256 EC/17 manufactured by the Reticon Corporation. The clock pulses, and enable pulses to operate the detector member 26 are supplied either externally (TTL level) or may be generated by an internal clock and counting device on a companion mother board also supplied by Reticon Corporation.

The radiation-detected signal 28, which is the output of the detector member 26, is directed through an op amp 30 which acts to amplify the output values. The amplified data is thence directed to the input of the A/D converter 32 for digitizing the information. A/D converter 32 receives an input start of conversion (SOC) pulse 204 which initiates the analog to digital conversion and, after a given cycle time, terminates the conversion automatically and generates an end of conversion (EOC) pulse 206 which initiates the next sequence of processing events. The aforementioned cycle time is optimally chosen to correspond with the 4 msec. cycle time of the array of photodiodes 26, although the skilled artisan will recognize that a number of other conceivable correlations are possible. An illustrative A/D converter for use with the instant invention is Model ADC-EH12B-2 manufactured by Datel Systems, Inc.

The A/D converter 32 provides digital outputs 208 which are digitized representations of the radiation-detected signal 28. The digitized outputs are directed to a CPU, which performs the same operations as comparing means 34 and 35 of FIG. 1. The CPU will sort and compare, upon receiving the EOC signal 206, the individual digitized data from A/D converter 32 to yield and output the maximum and minimum values. These values represent, respectively, the highest and lowest values generated by the instant system as the result of the reflected radiation striking the array 26 from the document 10. The maximum value corresponds to the background spectral characteristic of a document 10 while the minimum value corresponds to the line density spectral characteristic of a document 10. In deriving the minimum value the CPU 210 may typically take an average value over the lowest eight readings from the cells 26a and similarly the maximum value may be derived from an average over a number (eight, for example) of highest readings from cells 26a. To avoid anomalous readings the highest and lowest readings may be disregarded before the average values are derived.

The CPU 210 directs the maximum and minimum values to PROMs 36 and 38 respectively, which transmit back to the CPU 210 the appropriate adjustment values contained in their pre-programmed memories.

PROMs 36 and 38 contain information, as hereinbefore described, respecting the spectral response characteristics of the image-recording medium to be employed in the reproduction process. The PROMs may contain information relevant to only one type of image-recording medium, and may thus be a plug-in module. Different plug-in PROMs would then be utilized for various image recording machines. Alternately, any number of PROMs may be employed with appropriate switching in order to bring on line the proper PROMs containing the necessary information for comparison. Regardless, however, of the manner of operationally connecting the PROMs 36 and 38, the information is most preferably contained in tabular form for comparison with the digital signal from the CPU 210.

The values from the CPU 210 are synchronously fed to the PROMs 36 and 38 for read-out of a correlation function unique to the image-recording medium, preferably microfilm. The address determined by the CPU from the determined minimum and maximum values simply is used to select a memory location in PROMs 36 and 38 to extract the desired film characteristic data. Synchronizing clock pulses 212 are provided to the PROMs 36 and 38 as well as strobe pulses 214 and 216 for strobing high and low memory segments respectively.

The PROMs 36 and 38 provide, as an output, illumination and exposure correction signals which are applied to both display units 44 and 46 and discriminators 218 and 220, in parallel relationship therewith, through the CPU 210. The display units 44 and 46 are activated by a clock pulse 230 and enable and clear signals 240 and 250 respectively. The discriminators 218 and 220 receive the information for controlling appropriate adjustment circuitry in order to effect correction of the illumination and exposure parameters.

The illumination/exposure control system of the present invention is particularly designed to operate in concert with a photographic reproduction system, most especially a microphotographic or microfilm reproduction device 260. Accordingly, there will be associated some photoimaging means having a photoradiation gate located intermediate the document to be reproduced and the image-recording medium. Typically, this gate will be comprised of a variable diameter aperture and time-programmable shutter mechanism, the combination of which will influence the exposure parameters, with due regard for the illumination level provided by lamp or light source 16. Consequently, the outputs of the discriminators 218 and 220 will be suitably connected with the variable light source 16 and photoradiation gate of camera 260, respectively, to suitably adjust the same in correlation between the background and line density characteristics, which signals are processed and compared with the known spectral response characteristics of the film, as stored in the programmable read-only-memories. Correction signals will thus be generated which provide means for altering the illumination level and the exposure parameters by adjustment of the level of intensity from light source 16 and the aperture and shutter settings.

By way of visual display units 44 and 46, the operator is also apprised of the appropriate correction factors necessary to achieve a high quality reproduction of document 10. In this manner, there is optionally provided the ability for independent operator intervention to appropriately adjust the illumination and exposure parameters.

FIG. 3 is a schematic diagram of a typical timing circuit for use with the instant invention. A plurality of flip-flops F1–Fn are connected so that the pulses from a clock 306 are delayed by appropriate amounts before being used to control portions of the apparatus. Typically, one flip-flop is used to set the next downstream flip-flop which in turn provides a Q output used as a control signal. The same one flip-flop is also used to reset an upstream flip-flop so that a timed sequence of control signals $C_1, C_2 \ldots C_n$ are provided. The control signals $C_1, C_2 \ldots C_n$ may be connected for example to provide the clocking inputs for the clock pulses 202 and 230, the enable pulse 200, the SOC pulse 204, the synchronizing clock pulse 212, the plural strobe pulses 214 and 216, and the enable and clear signals 240 and 250.

Also, while the invention has not been described in terms of a preferred embodiment thereof, the skilled artisan will further appreciate that various substitutions, omissions, changes, and modifications may be made without departing from the spirit thereof. Accordingly, it is intended that the scope of the present invention be limited solely by that of the following claims.

I claim:

1. A document reproduction illumination/exposure control system for ascertaining the photometric qualities of a document to be photographically reproduced on an image recording medium and providing responsive control signals for illumination and exposure parameters for a document reproduction apparatus, comprising, in combination:
   (a) variable illumination means for projecting radiation on a document to be reproduced;
   (b) detecting means for receiving radiation incident from said document and generating a radiation-detected signal proportional thereto, said detecting means comprising a linear array of photoelectric elements for scanning a linear area of said document;
   (c) clock signal generating means for sequentially enabling elements of said photoelectric array to scan said linear area;
   (d) means for measuring radiation-detection signals for each element of said array;
   (e) means for deriving from said measured radiation-detection signals first extremum signals corresponding to a background light intensity value of said document and second extremum signals corresponding to a line density light intensity value of said document;
   (f) first memory storage means for storing background/spectral response information for the image recording medium, and for providing a first illumination/exposure control signal;
   (g) second memory storage means for storing line density/spectral response information for the image recording medium, and for providing a second illumination/exposure control signal;
   (h) means for feeding said first extremum signals to said first memory storage means for obtaining said first illumination/exposure control signal;
   (i) means for feeding said second extremum signal to said second memory storage means for obtaining said second illumination/exposure control signal; and
   (j) illumination/exposure control means for receiving said first and second control signals whereby illumination and/or exposure parameters are correlated between the spectral characteristics of said document and said image recording medium.

2. The system of claim 1, further comprising photoimaging means having a photoradiation gate intermediate said document and said image recording medium, said gate comprising a variable diameter aperture and a time-programmable shutter for controlling said exposure parameters.

3. The system of claim 1, wherein said radiation-detected signal is an analog signal proportional to said radiation incident from said document, said system further comprising means for converting said analog signal to a digital signal.

4. The system of claim 2, wherein said illumination/exposure correction means comprises:
   (a) an illumination discriminator in operative communication with said illumination means for receiving an illumination correction signal and adjusting said illumination in response thereto; and
   (b) an exposure discriminator in operative communication with said photoradiation gate, for receiving an exposure correction signal and adjusting said gate in response thereto.

5. The system of claim 4, wherein said deriving means comprises a central processing means for determining and storing the extremum values of said radiation-detected signal.

6. The system of claim 5, wherein said first and second memory storage means comprise read-only-memory means.

7. The system of claim 6, wherein said photoimaging means comprises a microfilm camera.

8. The system of claim 6, further comprising visual display means in parallel with said illumination and said exposure discriminators for visually displaying the correlated illumination and/or exposure parameters.

9. The system of claim 1, further comprising visual display means for displaying a representation of said first and second control signals.

* * * * *